United States Patent [19]
Doemens et al.

[11] Patent Number: 5,991,040
[45] Date of Patent: Nov. 23, 1999

[54] OPTICAL DISTANCE SENSOR

[75] Inventors: Günter Doemens, Holzkirchen; Anton Schick, Velden; Paul Köllensperger, München, all of Germany

[73] Assignee: Siemens Aktiengesellschaft, Munich, Germany

[21] Appl. No.: 08/981,728

[22] PCT Filed: Jun. 19, 1996

[86] PCT No.: PCT/DE96/01081

§ 371 Date: Dec. 23, 1997

§ 102(e) Date: Dec. 23, 1997

[87] PCT Pub. No.: WO97/02466

PCT Pub. Date: Jan. 23, 1997

[30] Foreign Application Priority Data

Jun. 30, 1995 [DE] Germany ............................ 195 24 022
Mar. 1, 1996 [DE] Germany ............................ 196 08 468

[51] Int. Cl.⁶ .................................................. G01B 11/24
[52] U.S. Cl. ............................................................ 356/375
[58] Field of Search ................................... 356/375, 4.06

[56] References Cited

U.S. PATENT DOCUMENTS

| 4,719,341 | 1/1988 | Hoogenboom . | |
|---|---|---|---|
| 4,965,442 | 10/1990 | Girod et al. . | |
| 5,329,358 | 7/1994 | Horijon | 356/375 |
| 5,448,359 | 9/1995 | Schick et al. | 356/375 |
| 5,594,242 | 1/1997 | Konishi et al. | 356/375 |

FOREIGN PATENT DOCUMENTS

| 0 615 607 B1 | 11/1992 | European Pat. Off. . |
|---|---|---|
| 1 949 117 | 9/1969 | Germany . |
| 3322712 C2 | 1/1985 | Germany . |
| WO 92/14118 | 8/1992 | WIPO . |
| WO 93/11403 | 9/1993 | WIPO . |

OTHER PUBLICATIONS

Patent Abstracts of Japan, vol. 6, No. 252, p. 161, Dec. 10, 1982.
Patent Abstracts of Japan, vol. 8, No. 204, p. 301, Sep. 18, 1984.
Patent Abstracts of Japan, vol. 018, No. 353, p. 1764, Jul. 4, 1994.
IBM Technical Disclosure Bulletin, Bd. 36, Nr. 9b, Sep. 1, 1993—"Position Sensing with Rotating Pinhole Confocal Optics".

*Primary Examiner*—Robert H. Kim
*Assistant Examiner*—Zandra V. Smith
*Attorney, Agent, or Firm*—Hill & Simpson

[57] ABSTRACT

In addition to triangulation methods, measurement systems according to the confocal principle are employed for the three-dimensional sensing of surfaces. These measurement systems have a higher resolution but, under certain circumstances, a lower data rate. An optical proximity sensor is described which, on the basis of the confocal microscope, carries out automatic inspection of surfaces in a time which is acceptable for a fabrication process. A linear system of corresponding light sources and photo receivers is used instead of a scanning beam, which requires a high outlay for generation. The optical path length between the receiving unit and the optical imaging arrangement is varied for the resolution of height values, wherein a light intensity maximum is detected by a peak detector.

14 Claims, 5 Drawing Sheets

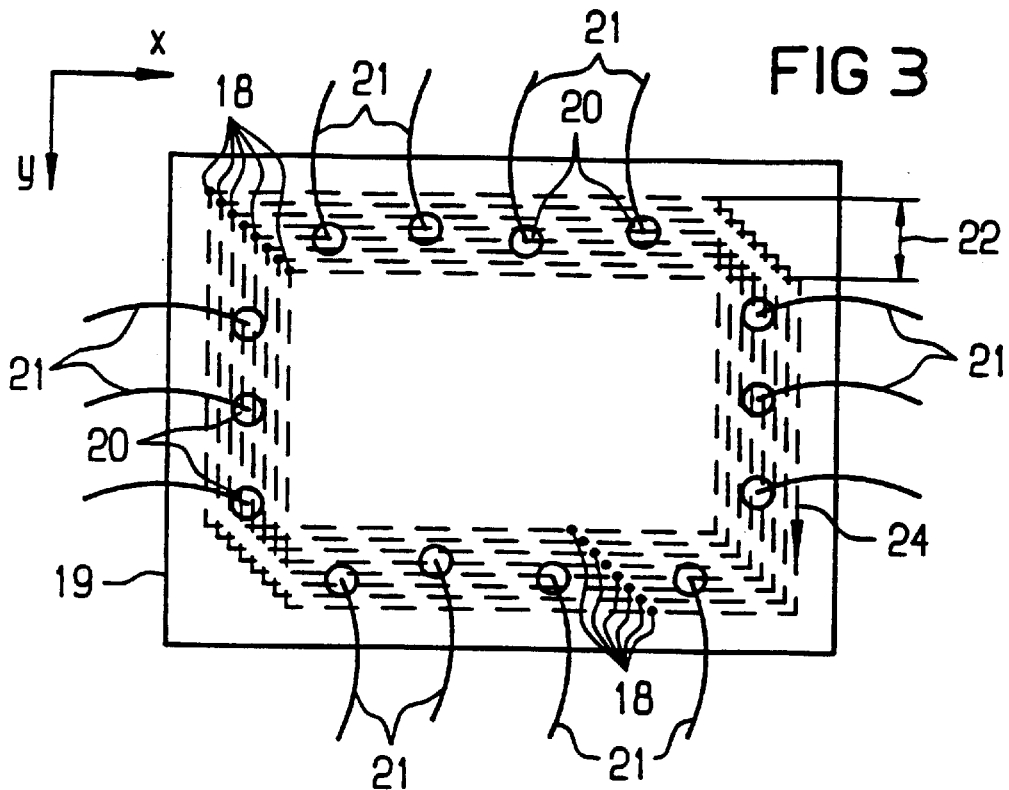
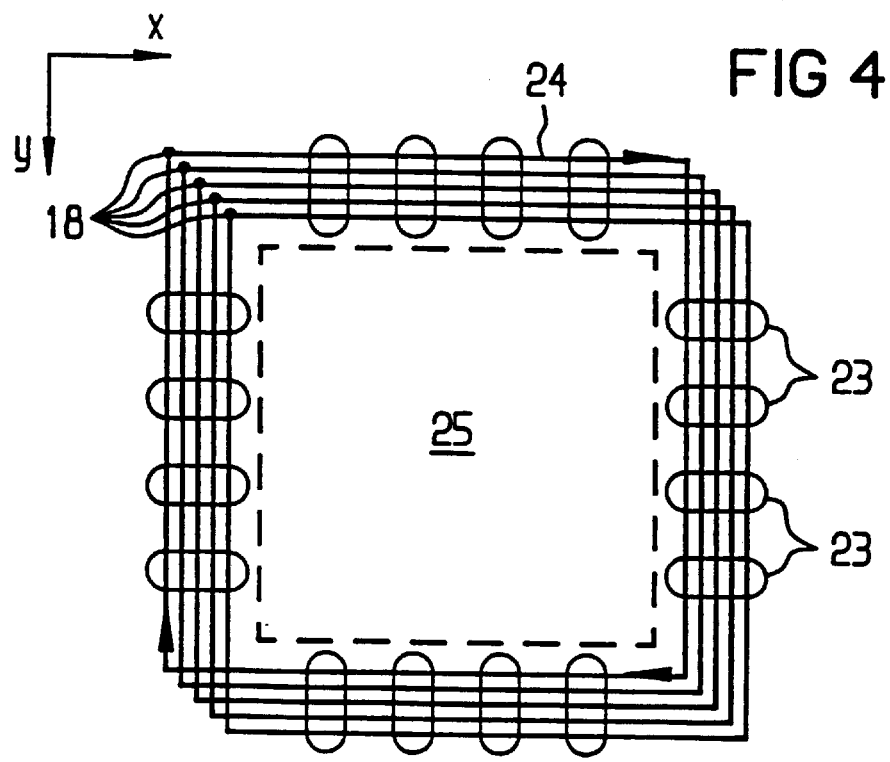

OPTICAL DISTANCE SENSOR

BACKGROUND OF THE INVENTION

1. Field of the Invention

The present invention relates to an optical proximity sensor according to the confocal optical imaging principle for determining distance or height values to or from a surface of an object to be measured. The plane coordinates of the multiplicity of measurement points are specified by the lateral displacement of a proximity sensor relative to the object to be measured, a grid pattern being generated.

2. Description of the Prior Art

Preferred areas of use of the present invention are in the field of connection and mounting processes in the fabrication of semiconductors and printed circuit board assemblies. As a rule, objects to be inspected have a three-dimensional character; for example, in the shape and height of the soldering bumps in ball grid arrays, in flip-chip contact-making or in the shape of nailheads in wire bonding. For this reason, fast three-dimensional sensing of the regions to be checked is necessary. As a rule, however, conventional three-dimensional sensors do got satisfy the requirements with regard to acceptable costs and adequate detection reliability in the case of highly reflective, curved areas.

Not only electrical testing but also external, mainly optical inspection has a significant role to play in the context of quality inspection in the fabrication of electronic parts. Since ever higher requirements with regard to quality are made of the connection and mounting processes in the fabrication of semiconductors and printed circuit board assemblies, the inspection methods that are correspondingly employed must be refined to an increasing extent. Thus, defect rates of less than 10 dpm (defects per $10^6$) are required. This ambitious aim cannot be achieved merely by optimizing the processes. Ultimately, automatic inspection is required after virtually every process step.

As a rule, conventional two-dimensional image processing methods do not satisfy today's requirements.

Triangulation methods are also frequently employed for the three-dimensional sensing of surfaces. However, at a resolution of 10 $\mu$m, for example, these methods are considerably restricted for optical reasons, such as secondary light reflection, for example. Confocal systems with a coaxial beam arrangement are significantly better suited for this purpose. However, the data rate that can be achieved is very limited as a result of the mechanically moved objective.

European Patent Specification EP 0 615 607, which relates to an optical proximity sensor, describes how to increase the data rate to 2 MHz and how to effect areal sensing using the confocal principle. The high data rate is achieved by a scanning system based on fast beam deflection. The relative movement between the object to be inspected and the scanning sensor is effected in a meandering manner. In order to avoid mechanical movements of the objective, a height determination is carried out on the image side by means of detectors which are staggered axially on the measurement beam. However, this principle, which is highly developed in terms of technology, is associated with very high costs.

Confocal inspection methods which, depending on the design, are largely independent of the optical properties of the surfaces are in any event being employed to an increasing extent in three-dimensional surface measurement. This is ideally achieved by subjecting the object surface to point illumination and by imaging the reflected light in turn on a point detector. The smaller the illuminated area and the detector area corresponding thereto, the greater the resolution and the higher the level of suppression of interference due to secondary scattered light and incorrect measurements due to the shape or due to the curvature in the region of the measurement spot. This can be formulated mathematically in such a way that even greatly curved, reflective areas appear to be flat when the measurement spot is a great deal smaller than the radius of curvature of the area.

WO-A-92/14118 describes an optical sensor which functions with structured light. The light source is adjustable here in such a way that it is possible to implement a change of the positions of high-contrast regions in a pattern, wherein an arrangement of detector elements form the detector. In this case, two images are each focused on an object, the focusing of the first image on the object being varied.

U.S. Pat. No. 4,719,341 discloses a so-called proximity sensor. In this case, the optical path length is varied but an intermediate image is not generated at any point. Converging light pencils do not pass to adjustable mirrors, with the result being that the requirements of a confocal system (point light source, point detector, object focused) are not given.

Conventional, commercially available confocal microscopes indeed have these optical properties but, as a rule, are too slow for the use in fabrication in light of the requisite mechanical tracking of the objects and/or of the microscope objectives.

SUMMARY OF THE INVENTION

The present invention is based on the object of providing a confocal optical proximity sensor which enables automatic surface inspection with a high data rate; the system costs being kept low.

The present invention is further based on the insight that the use of a single receiving unit on the image side with simultaneous periodic variation of the optical path length between this receiving unit and the optical imaging arrangement affords an optical proximity sensor with a high data rate. The height value of a scanned point on the surface of an object to be measured is yielded by using a pea detector to detect a maximum luminance of the measurement beam, such maximum being recorded in the receiving unit, and simultaneously capturing the corresponding optical path length which corresponds to the height value.

A further solution, which opens up the applicability of a sensor in specific mounting processes of electronic components, in particular in the inspection of soldering bumps having reflective surfaces in conjunction with extremely small radii of curvature, may also be obtained as follows.

In order to generate a real intermediate image in which the confocally arranged point light sources and sensors are superposed, the beam direction is simultaneously deflected through 180°, with a parallel offset, with the aid of an (oscillating) mirror system which is moved mechanically on the optical axis. The resulting real intermediate image is subsequently imaged on the object by means of a suitable optical arrangement. The light backscattered from the object is guided backward via the same oscillating mirror arrangement on to the stationary sensors or receivers. The current position of the mirror system at which the maximum luminance is measured corresponds to the instantaneous height value on the object surface.

An advantageous refinement of the present invention provides for the use of a plurality of optical receivers in the receiving unit. The arrangement thereof relative to the optical axis is specified, the same number of light sources being correspondingly present on the transmitting unit. This results in a simultaneous linear arrangement of measurement points on the object surface and an interaction of, for example, a first light source with a first receiver, a second light source with a second receiver, et cetera. If, for example, given such an arrangement of light-emitting sources, a plurality of scanning points on the surface of the object to be measured were picked up simultaneously, then it would be impossible to separate the location at the receiving end. In other words, "crosstalk" would prevent unambiguous measurements. Consequently, for this embodiment the data rate is limited insofar as serial scanning for the individual scanning points with a light source and a corresponding receiver is necessary.

What is essential is the variation of the optical path length between object and receiving unit and/or between object and transmitting unit either by mechanically moving the receiver, or by moving a mirror system which is positioned in the beam path, in combination with the parallel arrangement of receivers and transmitters and the separation of the individual transmission/reception channels by temporal variation of the intensity (time-division multiplex). The use of a mirror system instead of the oscillating receiver is recommended when the design of the oscillating receiver with regard to size and grid dimension clashes with the dimensioning parameters. The size of the receiver should be as small as possible in order to generate an oscillation, but this makes optomechanical handling more difficult by severely restricting the number of light sources that can be used simultaneously.

At the receiving end, it is possible to differentiate between a plurality of light sources which are simultaneously switched on by virtue of the various light sources having different light frequencies. This is done at the receiving end by corresponding modulation of the individual light sources having different frequencies. At the receiving end, a bandpass filter arrangement connected between receiving unit and peak detector is used in each case to differentiate the scanning point to which the detected peak in the luminance belongs. This scanning point is generated by light of a specific frequency.

Another advantageous refinement of the present invention for scanning the surface of an object which is to be measured and is of laterally right-angled design, such as, for example, a printed circuit board assembly with electronic components situated thereon, provides for the row of simultaneously generated scanning points having a lateral incidence of 45° with respect to the proximity sensor or the object to be measured. If for example, orthogonal scanning tracks, for example a frame, are provided in the case of customary objects to be measured, then the abovementioned measure means that it is not necessary to rotate the scanning head, the scanning sensor or the measuring head relative to the object to be measured in the event of a change in direction in the travel path by 90°.

Additional features and advantages of the present invention are described in, and will be apparent from, the detailed description of the is presently preferred embodiments and from the drawings.

DESCRIPTION OF THE DRAWINGS

FIG. 3 shows a surface of an electronic component provided with bonds arranged in an approximately rectangular fashion.

FIG. 4 shows lateral arrangements at fitting locations of an electronic component with solder deposits on a corresponding printed circuit board.

DETAILED DESCRIPTION OF THE PREFERRED EMBODIMENTS

Figure 1:
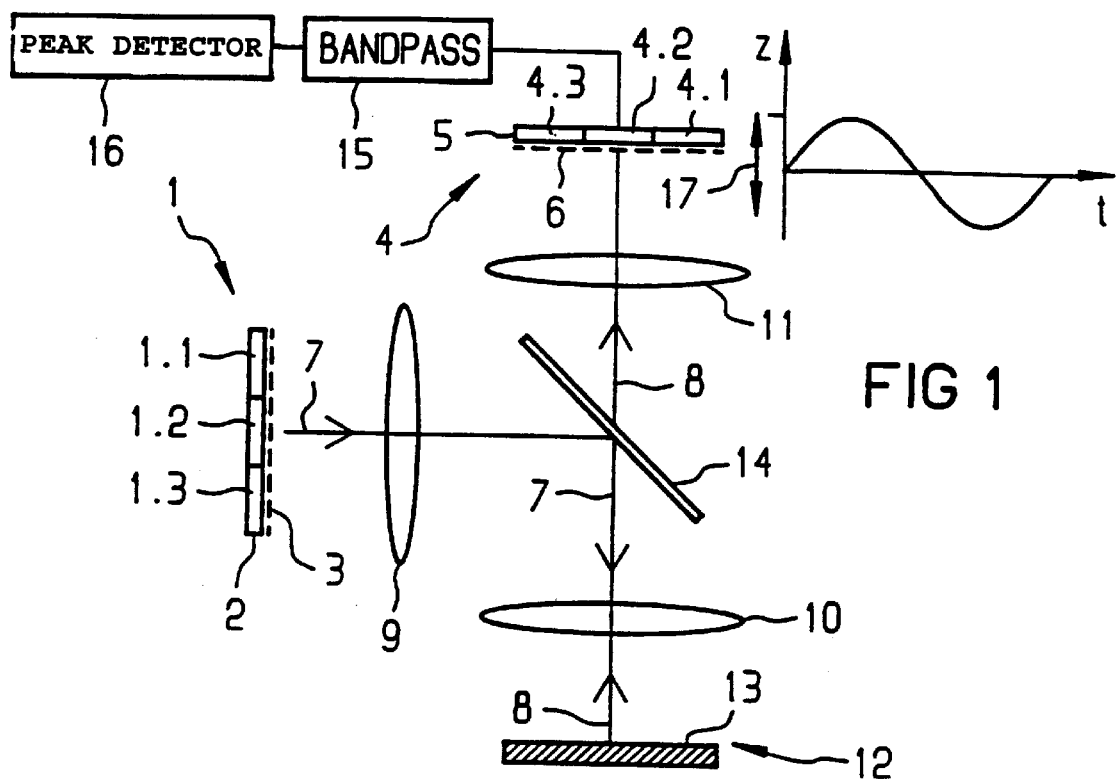
FIG. 1 shows a schematic diagram of a confocal optical proximity sensor in accordance with the principles of the present invention.

FIG. 1 illustrates an optical proximity sensor according to the confocal principle. A sensor of this type operates with point light sources 2 which are imaged on the surface 13 of an object 12 to be measured. The light backscattered from the object 12 to be measured is imaged into a likewise point receiver or a receiving unit 4. The object 12 to be measured and the image generated at the receiving unit are located at the focus of the illumination beam 7 and of the measurement beam 8, respectively. The illumination beam is in this case static and defines the height measurement range on the basis of its depth of focus. A more detailed description of the confocal principle can be found, for example, in European Patent Specification EP 0 615 607.

A transmitting unit 1 is illustrated at the transmitting end in FIG. 1. This transmitting unit contains one or more point light sources 1.1,1.2, . . . each comprising a light source 2 and a diaphragm 3. The illumination beam 7 is generated by this means. The optical arrangement 9, 10, 11 interacts as a whole and represents the optical imaging arrangement. The periodically variable optical path length between the receiving unit 4 and the optical imaging arrangement should in this case be understood to mean the path length to the optic 11. The illumination beam 7 is directed via the splitter mirror 14 in the direction of the object 12 which is to be measured and has the surface 13. The reflected measurement beam is routed to the receiving unit 4 by means of the optical arrangement 10 and 11 and also the splitter mirror 14.

The receiving unit 4 comprises photoreceivers 5 with respectively associated diaphragms 6, thereby constituting point receivers 4.1,4.2, . . . . Since the mass of the optical imaging arrangement, or parts thereof, is relatively large, in practice it is more favorable, for the purpose of generating the variation of the optical path length, to cause the receiving unit 4 to oscillate in the direction of the optical axis. This is indicated by the height value z/time t diagram illustrated at the side. The oscillation direction 17 is parallel to the optical axis of the system in the measurement region on the image side. The oscillation, for example 2 kHz, is periodic; in particular, sinusoidal.

Theoretically, it would be possible to use a single point light source 1.1 and a single point receiver 4.1. The data rate that can be achieved thereby when scanning an entire surface of a component 19 is very low, however. If the number of point light sources and receivers is increased, then a first light source respectively corresponds to a first receiver, a second light source to a second receiver, et cetera. Instead of serial scanning, the light sources or the light of the various light sources are modulated differently, so that the light has different frequencies. Consequently, in accordance with the number of light source/receiver pairs, a corresponding number of scanning points 18 in a straight line are generated on the surface 13. As already described, one height value is determined approximately simultaneously for each point.

Figure 2:
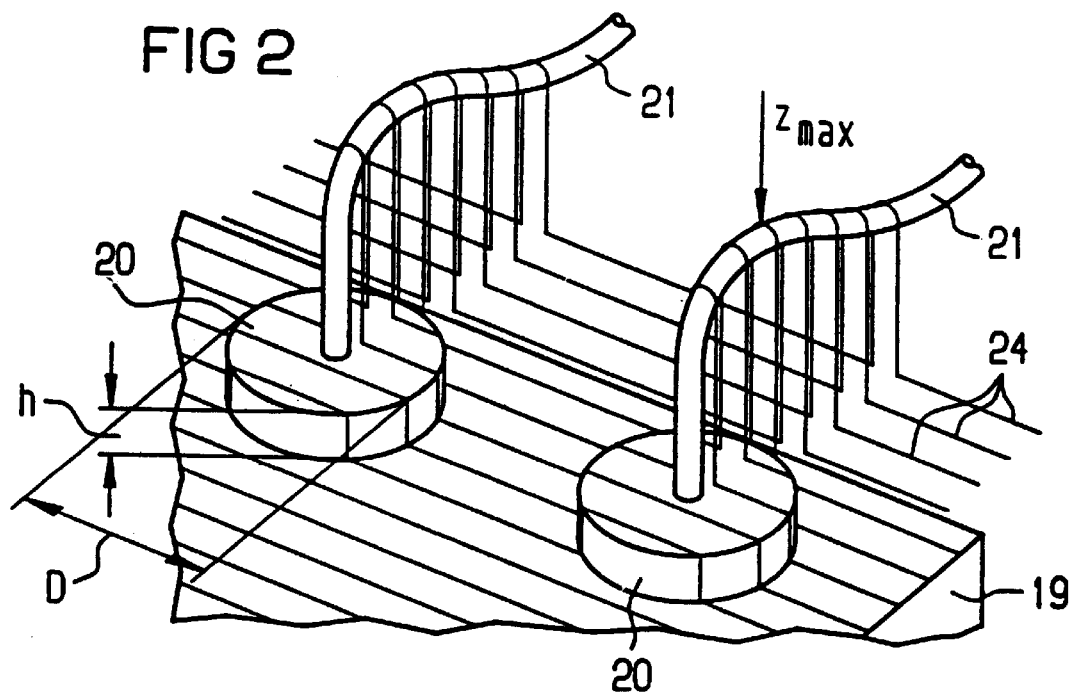
FIG. 2 shows a perspective view of a surface of an object to be sensed provided with bonds and bonding wires.

FIG. 2 illustrates a detail from the surface of an electronic component 19, fastened with bonds 20 and bonding wires 21. Specifications permit a maximum height $z_{max}$ in order not to damage the bonding wires 21 in downstream process steps. Furthermore, the height h and diameter D of the bonds 20 must comply with specific values. The lines 24 illustrated in FIG. 2 represent the general travel path 24. The requirement regarding the scanning rate initially determines whether one or more light source/receiver pairs with the corresponding number of scanning points 18 are used. The fact that a plurality of scanning points 18 can be simultaneously generated should, however, be seen in the context of the sensor head or scanning sensor having a lateral movement relative to the surface 13 of the object 12 to be measured.

The microscope described according to the present invention has the aim of making the three-dimensional optical inspection of electronic units considerably more cost-effective and faster. To that end, a confocal height measurement is simultaneously carried out at a plurality of measurement points arranged on a line, with the result that during relative movement between the object to be measured and the sensor, a strip (line, row) of parallel scanning points is produced; for example, 30 of them. This structure of the sensor and the inspection rates that can be achieved with it are, on the whole, practical only when the regions of electronic components that are sensed by means of this strip are only the edge regions in which, for example, soldered joints to be checked are located. As a result, in the case of a customary electronic assembly, the scanning is reduced to about 5% of the total printed circuit board assembly. The aspect of partial surface sensing in conjunction with the confocal microscope having parallel operation is essential and initially leads to an acceptable cost/performance ratio. The partial and flexible sensing also opens up the possibility of extending the inspection only to critical regions.

FIG. 3 shows an electronic component 19, on whose upwardly directed surface 13 a plurality of bonds 20 have been placed in an orthogonal arrangement. The bonds are connected by means of bonding wires 21 to electrical terminal points on, for example, a lead frame (not illustrated). The use of an optical proximity sensor according to the present invention generates a row of scanning points 18 in a straight line. Since all that need be checked on the component 19 are the bonds 20 and the corresponding bonding wires 21, it is possible to trace a kind of frame, which is likewise configured orthogonally, for the general travel path 24 of the sensor relative to the component 19. Since the row of scanning points 18 illustrated here has an incidence of 45° relative to the travel path 24, it is not necessary to rotate the inspection head with the scanning sensor. If the scanning sensor traces the travel path 24 illustrated in FIGS. 3 and 4, then a type of corridor parallel to the X axis and parallel to the Y axis is sensed each time; the corridor having a width 22 of 256 μm, for example.

FIG. 4 likewise shows, in a two-dimensional illustration corresponding to FIG. 3, a travel path 24 with which the solder deposits 23 to be inspected are scanned. The design of the orthogonal frame for the travel path 24 applies analogously in this case. A component 19 is not yet present at the fitting location 25 at this point in time. In this application, the position, shape and volume of the solder paste deposits are inspected.

The mechanical movement of a receiver is facilitated if its mass is low. For this reason, both the receiving unit 4 and a parallel light source arrangement must be given very small dimensions with regard to the size and the grid dimensions. As a result, the optomechanical handling is made more difficult and the number of light sources or scanning points 18 that can be employed simultaneously is severely restricted.

With a parallel arrangement of transmitters and receivers, it is possible for optical crosstalk and thus incorrect measurements to occur. This is manifested particularly when the illumination spot diameters and/or the corresponding diaphragm diameters are large in relation to the lateral spacings. Since the Rayleigh length of the intrinsically inflexible illumination beam specifies the height measurement range in a configuration with a moving receiver, the aperture angle must be given a small dimension. The consequence of this is that the measurement spot diameter is relatively large even in the region of the beam waist. Crosstalk must therefore be suppressed by a measure such as, for example, temporal variation of the intensity or differentiation by means of different frequencies of the light. The confocal detector in conjunction with an oscillating mirror system has the following advantages:

By a corresponding selection of the lenses, the confocal detector arrangement and light source arrangement can be imaged with a size reduction in the moving intermediate image. As a result, the mirrors can be given very small dimensions and correspondingly high frequencies are achieved for the oscillating mirrors.

There are many selection options available with regard to the dimensioning of grid element spacings of the light sources and of the detectors, since the magnification scale can be set by an appropriate design of the optical imaging arrangements.

The height measurement range is no longer specified by the form of the illumination beam, but rather by the selection of the optical arrangements in conjunction with the amplitude of the mechanical oscillation of the mirror system 30. In the case of the mirror system described, the intermediate image moves by twice the amplitude of the mirror oscillation.

Since the focal plane of the illumination beam is concomitantly moved in the object region, it is possible to increase the numerical aperture of the illumination beam and the resolution in the axial and lateral directions (height and width).

In parallel operation, a corresponding receiver is present for each light source, in which case optical crosstalk can lead to incorrect measurements. The crosstalk becomes greater as the diameter of the confocal detector area becomes greater relative to the distance between the receivers. Owing to the confocal imaging, the distance between the individual light sources is proportional to the mutual distance between the detectors. If, for example, light sources having large luminous spot spacings with a constant angle of radiation or luminous spot sizes are selected and are reduced to the requisite extent in the intermediate image or object region, then the crosstalk can be considerably reduced. Thus, it is possible to use a laser diode arrangement having a grid dimension of 125 μm instead of having a grid dimension of 25 μm. In this case, under certain circumstances it is possible to dispense entirely with electronic suppression of the crosstalk, which in turn reduces the technical outlay and thus the costs of a sensor of this type.

On account of the suppression of crosstalk by a suitable selection of the ratio of measurement spot diameter to measurement spot spacing, the light sources do not have to be driven separately or be capable of differentiation by means of different frequencies. This enables parallel surface scanning with just a single light source. The beam splitting into the various transmission channels can then be effected by means of light-defracting elements, for example.

One embodiment of the present inventive manages without beam-deflecting scanning units. Likewise, there is no use at all of receivers arranged in a staggered manner along the measurement beam. The single receiving unit that is present can be moved piezoelectrically, magnetostrictively or electromagnetically, for example. An oscillation frequency that is sufficient for practical applications is 2 kHz. At the same time, the increase in the data rate is achieved by the use of a plurality of light sources 1.1,1.2, . . . in the transmitting unit 1 and a plurality of corresponding receivers 4.1, 4.2, . . . in the single receiving unit 4. Integrated rows of photodiodes can be used as the receivers, for example. Laser diode arrays are preferably used as the light sources. The previous description was based on the use of diaphragms 3, 6, since the light sources 2 or the photoreceivers 5, insofar as customary types are used in a normal costs framework, cannot be regarded as point sources or point receivers. With lasers, the use of diaphragms is not necessary.

However, at any time the intensity of the parallel light sources 2 can be varied temporally according to respectively different relationships, with the result that an unambiguous assignment at the receiver end and thus crosstalk is absolutely eliminated. For slow applications, serial operation of the light sources 2 and of the talks 5 is also possible. The arrangement of a single photodetector behind a pinhole diaphragm array is sufficient in this case.

If the parallel operation of a plurality of transmitting-receiving units is employed in order to generate a high data rate, then initially only the scanning of lines is possible during the movement of an object 13 to be measured in one direction. As a rule, the monitoring of the edge regions of a chip or of a component 19 is sufficient in connection and mounting processes of semiconductor and printed circuit board assembly technology. However, these regions extend to the entire periphery of the component. In order that the sensor head does not have to be rotated in the case of necessary orthogonal scanning tracks of this type, the axis of the transmitters and receivers, which are correspondingly arranged linearly, and the alignment of the row of scanning spots on the surface 13 are oriented at 45° with repect to the scanning direction.

The mechanical oscillatory movement of the receiver of the image side and the parallel arrangement of a plurality of receivers and transmitters respectively next to one another can be realized in a simple and cost-effective manner. The separation of the individual transmission and reception channels by means of different light frequencies increases the selectivity between the individual channels. The 45° arrangement of the row of scanning points relative to the orthogonal scanning directions simplifies the guidance of the inspection head. Expediently, the scene is not sensed in its entirety. Rather, only those regions are sensed which are to be inspected and which are essentially placed in the edge region on a large-area surface of an electronic component. The use of a system with a mirror system for varying the optical path length affords further-reaching technical advantages mentioned above, which are associated with further identification reliability and an additional cost saving.

Figure 5:
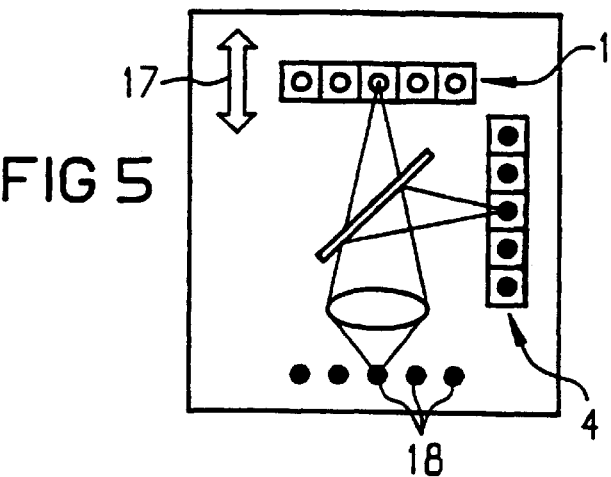
FIG. 5 shows a basic illustration of a system having an oscillating receiving unit.

FIG. 5 illustrates a greatly simplified schematic sketch of a system with an oscillating receiver, where the following typical values of the method can be cited:

| Resolution (x, y, z): | 10 μm |
|---|---|
| Height measurement range: | 500 μm |
| Parallel scanning tracks: | 30 |
| Data rate: | 150 kHz |
| Travelling speed: | 4 cm/sec |

Figure 6A:
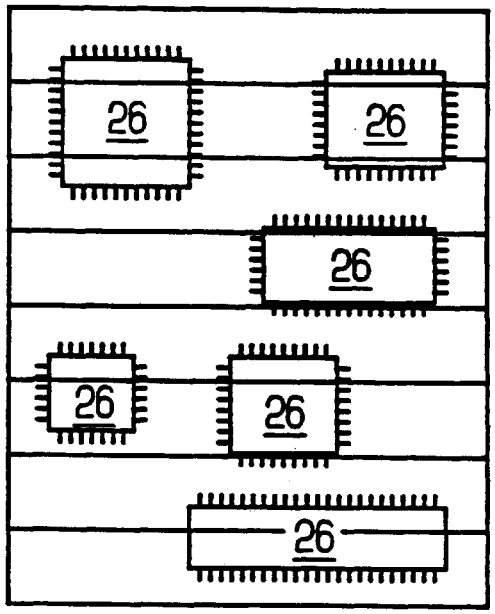
FIG. 6a shows a complete three-dimensional sensing of a printed circuit board assembly in accordance with the principles of the present invention.
Figure 6B:
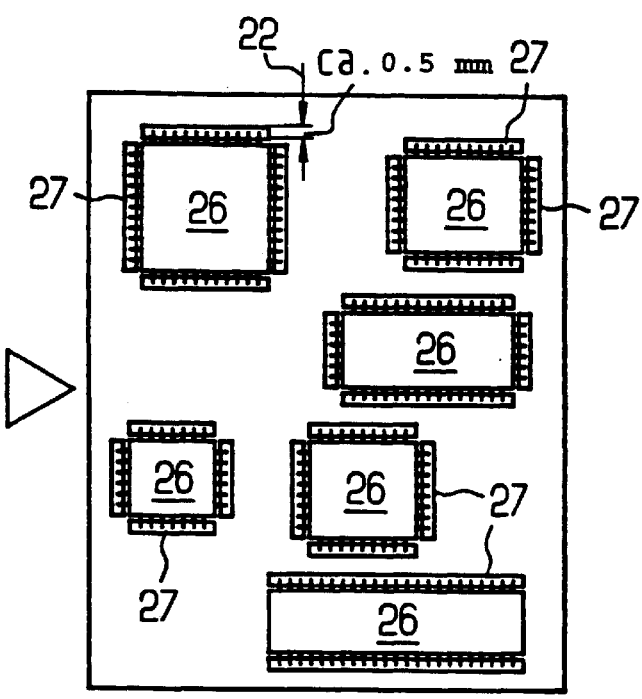
FIG. 6b shows the partial sensing of a printed circuit board assembly.

The significant time and cost savings can be seen in FIGS. 6a and 6b, the regions to be scanned being illustrated in each case. In FIG. 6a, the three-dimensional sensing of the surface relates to the entire printed circuit board assembly, for example, a printed circuit board with components 26 located thereon. The scanning region is over the whole area. In FIG. 6b, only partial scanning operations are performed. The scanning regions 27 are orthogonal strips, the soldered joint inspection of the electrical connections of the components 26 being completely ensured by the scanning and evaluation of the strips. The partial sensing of the surface of the printed circuit board assembly amounts to 5% of the total area, for example.

Figure 7:
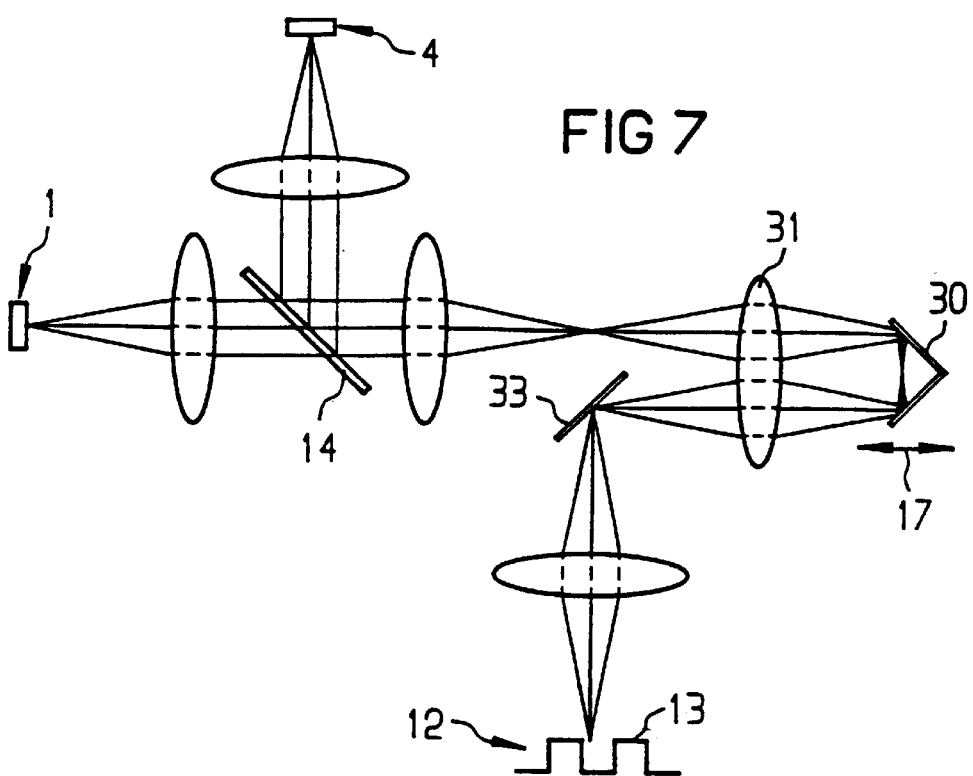
FIG. 7 shows an arrangement of a confocal optical system wherein an optical path length is varied by means of an oscillating mirror system.

FIG. 7 shows the structure of a confocal microscope, including a transmitting unit 1, a receiving unit 4, a splitter mirror 14, a mirror system 30 and a system of optical imaging arrangements. In this case, the surface 12 of the object 13 to be measured can be scanned and a relief image thereof can be generated. The mirror system 30 comprises a unit of two mirrors which are offset by 90° relative to one another and are connected or can at least be moved uniformly. The system has moved in the oscillation direction 17. The optical path length is varied as a result of this oscillation. The oscillation is preferably a sinusoidal oscillation. The frequency may be 2 MHz, for example. Under optical path length, according to FIG. 7 it is possible firstly to consider the path length between the imaging optic 31 and the mirror system 30. What are essential, however, are the changes in the beam path between the scanning of the object surface 13 and the receiving unit 4 or the transmitting unit 1. An intermediate image in which the confocally arranged point light sources of the transmitting unit 1 and the detectors of the receiving unit 4 are superposed is generated at the mirror system 30. At the mirror system 30, the beams are reflected back through 180°, in total, to the structure which is visible in FIG. 7. This is done with a parallel offset, however, So that the beam path is guided twice through the imaging optic 31. The axis of symmetry of the mirror system 30 lies on the optical axis of the imaging optic 31. Furthermore, the mirror system 30 lies in the converging region of the light pencils on one side of the imaging optic 31.

Figure 8A:
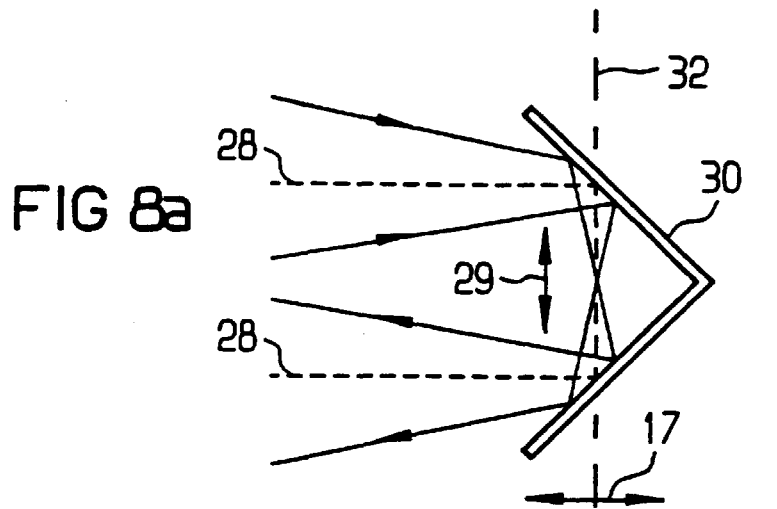
FIGS. 8a, 8b and 8c diagrammatically show the movements of the mirror system of FIG. 7 and of the intermediate image generated accordingly.
Figure 8B:
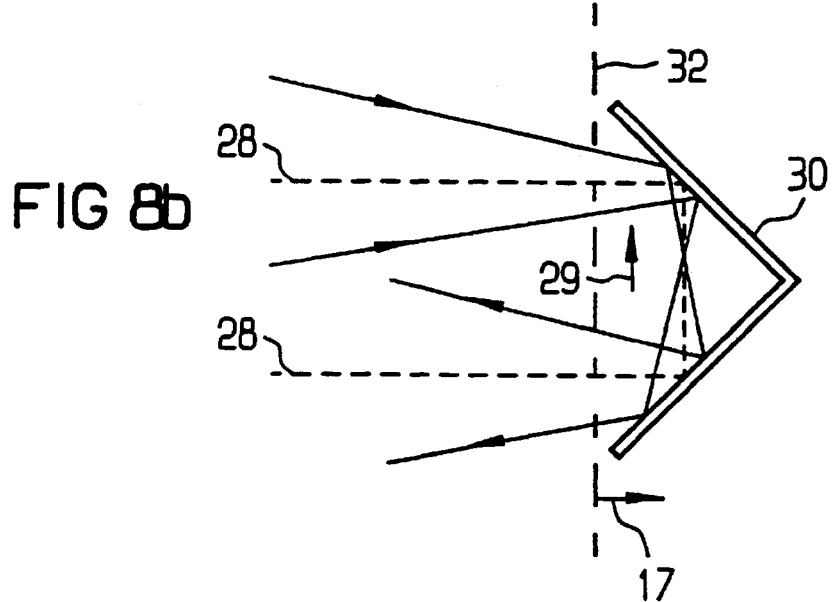
Figure 8C:
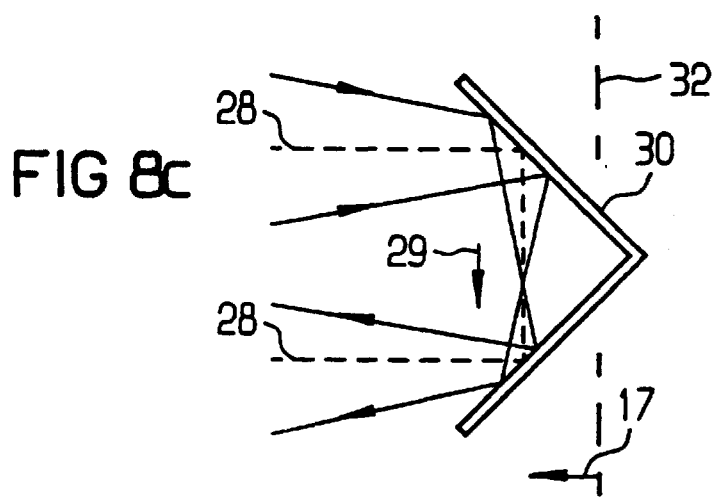

FIGS. 8a, 8b, 8c illustrate the beam path at the mirror system 30, the zero position 32 and the movement of the reflected image during the oscillation of the mirror system 30 being indicated. In FIG. 8a, the mirror system 30 is approximately in the zero position relative to the oscillation direction 17. The axial beams (the approximately axial or axially parallel beams) 28 are reflected by 2×90°. Further, non-axially aligned beams, which are illustrated using continuous lines with corresponding arrows, are reflected by a total of 180°. The intermediate image is likewise in a central position. The transition from FIG. 8*a* to FIG. 8*b* comprises a displacement to the right which is effected in accordance with the oscillation direction 17. In this case, the position of the intermediate image is displaced upwards in accordance with the movement 29. The deflection of the axial beams remains identical. The beam path of further, non-axially guided beams is altered correspondingly. The transition from FIG. 8*a* to FIG. 8*c* comprises the mirror system 30 having been displaced from the zero position 32 to be left in accordance with the oscillation direction 17. The reflection of the axial beams 28 continues to remain unchanged relative to the mirror directions. The reflection of other, non-axially guided beams is altered in such a way that the movement 29 of the intermediate image 29 is directed downward.

Figure 9:
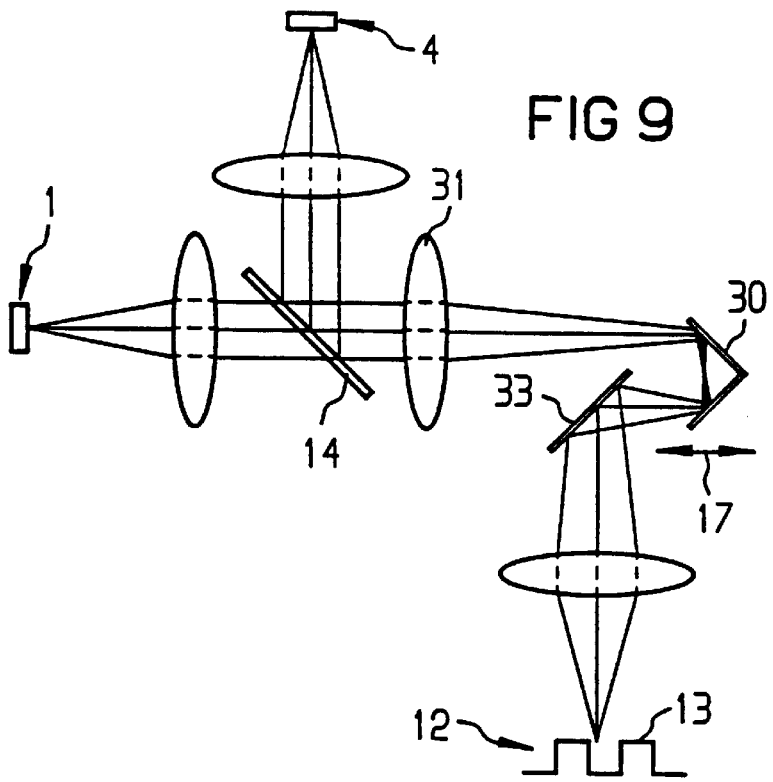
FIG. 9 shows an alternative embodiment of the confocal optical system as shown in FIG. 7.

FIG. 9 shows a variant of the invention, where the beam paths are guided only once through the imaging optic 31. The beam paths are deflected on to the object via an additional deflection mirror 33.

Although the present invention has been described with reference to specific embodiments, those of skill in the art will recognize that changes may be made thereto without departing from the spirit and scope of the invention as set forth in the hereafter appended claims.

We claim:

1. An optical proximity sensor, comprising:
   a transmitting unit having a plurality of point light sources wherein each point light source provides an illumination beam which is imaged at a scanning point on a surface of an object to be measured and a measurement beam which is reflected off of the surface;
   a receiving unit having a plurality of point light receivers corresponding to the plurality of point light sources such that each point light receiver is arranged confocally with the measurement beam of its respective point light source, and wherein each respective pair of point light sources and point light receivers is arranged linearly in a plane which is orthogonal to an optical axis of both the respective illumination and measurement beams such that it is possible to generate a row of scanning points in a straight line on the surface of the object;
   a first optic positioned nearest the object for providing coaxial guidance of the illumination and measurement beams therebetween;
   a second optic positioned nearest to the receiving unit wherein an optical path length of the measurement beam of each point light source between the receiving unit and the second optic may be varied wherein the optical path length corresponds to a respective height value of a current scanning point; and
   a peak detector connected to the receiving unit, the peak detector establishing maximum luminance of the receiving unit.

2. An optical proximity sensor as claimed in claim 1, further comprising:
   a plurality of band pass filters, each of the plurality of band pass filters associated with one of the plurality of point light receivers wherein each band pass filter is matched to a frequency of the light at its respective point light source.

3. An optical proximity sensor as claimed in claim 1, wherein the plurality of point light sources and corresponding point light receivers are respectively arranged to form a row of scanning points in a straight line, the row of scanning points forming an angle of approximately 45° with a travel path of the proximity sensor, and with the confocal optical imaging principle applied to the beam guidance of each scanning point.

4. An optical proximity sensor as claimed in claim 3, wherein the travel path is aligned on orthogonally designed structures of the object.

5. An optical proximity sensor as claimed in claim 3, wherein predetermined, significant regions of the surface are sensed to allow for only partial scanning of the surface.

6. An optical proximity sensor as claimed in claim 5, wherein the significant regions of the surface are edge regions of electronic components.

7. An optical proximity sensor, comprising:
   a transmitting unit having at least one point light source, the at least one point light source providing an illumination beam which is imaged at a scanning point on a surface of an object to be measured and a measurement beam which is reflected off of the surface;
   a receiving unit having at least one point light receiver arranged confocally with the measurement beam of the at least one point light source;
   a first optic positioned nearest the object for providing coaxial guidance of the illumination and measurement beams therebetween;
   a mirror system including two mirrors which are inclined 90° with respect to one another for deflecting in a parallel offset manner both the illumination and measurement beams of the at least one point light source through 180°;
   an imaging optic for guiding both the illumination and measurement beams of the at least one point light source to and from the mirror system wherein the mirror system is positioned in the region of focus of the imaging optic and may oscillate in an optical axial direction of the imaging optic to vary both a first optical path length between the transmitting unit and the object and a second optical path length between the object and the receiving unit; and
   a peak detector connected to the receiving unit, the peak detector establishing maximum luminance of the receiving unit.

8. An optical proximity sensor as claimed in claim 7, further comprising:
   an additional deflection mirror wherein the coaxially guided illumination and measurement beams are guided between the imaging optic and the object, with off-centered guidance in the imaging optic, by means of the mirror system and the additional deflection mirror via an optical arrangement between the additional deflection mirror and the object.

9. An optical proximity sensor as claimed in claim 7, further comprising:
   a plurality of point light sources in the transmitting unit; and
   a plurality of point light receivers in the receiving unit corresponding to the plurality of point light sources, wherein each respective pair of point light sources and point light receivers is arranged linearly in a plane which is orthogonal to an optical axis of both the respective illumination and measurement beams such that it is possible to generate a row of scanning points in a straight line on the surface of the object.

10. An optical proximity sensor as claimed in claim 9, further comprising:

a plurality of band pass filters, each of the plurality of band pass filters associated with one of the plurality of point light receivers wherein each band pass filter is matched to a frequency of the light at its respective point light source.

11. An optical proximity sensor as claimed in claim 9, wherein the plurality of point light sources and corresponding point light receivers are respectively arranged to form a row of scanning points in a straight line, the row of scanning points forming an angle of approximately 45° with a travel path of the proximity sensor, and with the confocal optical imaging principle applied to the beam guidance of each scanning point.

12. An optical proximity sensor as claimed in claim 11, wherein the travel path is aligned on orthogonally designed structures of the object.

13. An optical proximity sensor as claimed in claim 11, wherein predetermined, significant regions of the surface are sensed to allow for only partial scanning of the surface.

14. An optical proximity sensor as claimed in claim 13, wherein the significant regions of the surface are edge regions of electronic components.

\* \* \* \* \*